United States Patent [19]

Ng et al.

[11] 3,837,922
[45] Sept. 24, 1974

[54] IMPLANTABLE FUEL CELL
[75] Inventors: Daniel Y. C. Ng, Chicago; Sidney K. Wolfson, Jr., Highland Park; Anthony J. Appleby, Chicago, all of Ill.
[73] Assignee: Institute of Gas Technology, Chicago, Ill.
[22] Filed: Sept. 12, 1969
[21] Appl. No.: 857,322

[52] U.S. Cl. .................... 136/86 R, 3/1, 136/86 E
[51] Int. Cl. .................. H01m 27/00, H01m 27/30
[58] Field of Search .......... 128/1, 214; 3/1, DIG. 2; 136/86

[56] References Cited
UNITED STATES PATENTS

| | | | |
|---|---|---|---|
| 409,365 | 8/1889 | Mond | 136/86 R |
| 3,133,537 | 5/1964 | Muth | 128/2 |
| 3,196,048 | 7/1965 | Shropshire | 136/86 E |
| 3,276,909 | 10/1966 | Moos | 136/120 FC |
| 3,294,588 | 12/1966 | Beltzer et al. | 136/86 |
| 3,331,848 | 6/1967 | Davis et al. | 136/86 E |
| 3,353,539 | 11/1967 | Preston | 128/419 |
| 3,360,401 | 12/1967 | Grasselli et al. | 136/86 |
| 3,379,191 | 4/1968 | Harvey | 3/1 X |
| 3,434,162 | 3/1969 | Wolfe | 3/1 |
| 3,554,809 | 1/1971 | Craft | 136/86 R |

OTHER PUBLICATIONS
Implantable Fuel Cell For Artificial Heart, PB177695, pages A-14 and A-15.
Potter et al., Proc. Royal Soc. London, (Series B), Biolog. Papers, Vol. 84, Mar. 1912, pp.260–76.

*Primary Examiner*—A. B. Curtis
*Assistant Examiner*—H. A. Feeley
*Attorney, Agent, or Firm*—Molinare, Allegretti, Newitt & Witcoff

[57] ABSTRACT

An implantable fuel cell power source for an artificial heart or pacemaker device which utilizes blood carbohydrates as the anode fuel. The cathode of the implantable fuel cell is an oxygen utilizing cathode, and may be air breathing, for example, following being ventilated through a percutaneous airway by a balloon system. The fuel cell may be integrated as part of a heart pump prosthetic mechanism, or placed at some remote location where a portion of the venous blood can be diverted to the fuel cell on its way to the heart. The anode chamber of the fuel cell may form a portion of the atria or the blood collecting plenum of the heart pump, but preferably is placed at the outflow passage of the prosthetic heart pump right ventricle so that the pumping force provides enough power to overcome the resistance of both the anode and the pulmonary vascular bed. The anode is separated from the whole venous blood by a thin, porous membrane capable of passing a blood ultra-filtrate containing the oxidizable organics. The organics contact the catalyst anode which is preferably of a "felt" -type construction, with the ultra-filtrate at approximately neutral pH acting also as the electrolyte. The anode is backed by a similar membrane, on the obverse side of which is coated the cathode catalyst. The implanted fuel cell may be connected in parallel with an implanted storage battery to form a hybrid power system which gives a fuel cell - storage battery hybrid system an outstanding redundancy capability.

7 Claims, 2 Drawing Figures

- 85 (STRUCTURAL PLASTIC)
- 94 (CATHODE AIR CAVITY)
- 86 (CATHODE SUPPORT MEMBRANE)
- 5 (GASEOUS DIFFUSION CATHODE, ON MEMBRANE 86)
- 87 (BLOOD IN ANODE CHAMBER)
- 7 (ANODE IN ANOLYTE CHAMBER 6)
- 88 (ORGANICS EXCHANGE MEMBRANE)
- 89 (BI-CELL UNITS CONNECTED IN SERIES OR PARALLEL)

Inventors:
Daniel Y. C. Ng
Sidney K. Wolfson, Jr.
Anthony J. Appleby
By Bair, Freeman & Molinare
Attys.

IMPLANTABLE FUEL CELL

BACKGROUND OF THE INVENTION

1. Field of the Invention

The field of this invention relates to power sources for artificial heart or pacemaker devices that can be totally implanted in a patient's body, and more particularly to fuel cell power sources which utilize blood carbohydrates such as glucose as the anode fuel.

The need for artificial hearts is highlighted by the estimate that 14.6 million adults suffer from cardiac disease, and nearly as many are suspected to have heart disease. Of these, about one-half million persons can be considered to be a candidate for an artificial heart device. While an ultimate solution to heart disease may be dietary or pharmacological, the variety of types of heart diseases, the lack of biological uniformity of individuals, and the problem of drug side effects points to artificial hearts as at least an intermediate solution. Because of the rejection phenomena, transplants have not proven to be particularly successful as even an intermediate solution to heart disease. Depending of course, on the progress of biochemical and medical science, and the availability of donors (human or non-human), artificial hearts may also be a long-range solution to heart disease.

2. Background of the Prior Art

An artificial heart system may be considered to be made up of two major parts: 1) an artificial heart pump circulation system, referred to hereinafter simply as a "pump," and 2) the power source for operation of the pump, and the attendant control systems.

The Pump

Our invention is directed to the second major part, the power source itself, and the power source in combination with any suitable pump either directly electrically driven or having an electric "motor" as the motive source for the actual pumping mechanism. Any of the prior art pumps suitable for implantation and electrically operable, may be used in conjunction with our power source.

The Power Source

When emergency and temporary circulatory assist devices are applied to hospitalized patients, external power sources are permissible. However, for permanent left ventricular assist devices or total heart replacement devices in ambulatory patients, total implantability is an important prerequisite to permitting the patient to lead a reasonably normal and gainful life.

Many modes of power sources have been suggested, including storage batteries, nuclear isotope powered "prime movers," and fuel cells. For example, in two Fry et al. patents, U.S. Pat. Nos. 2,917,751 and 3,152,340, a battery powers an electric motor which in turn mechanically actuates a bellows-type heart pump. A totally implantable radioisotope power source is disclosed in U.S. Pat. No. 3,379,191 to Harvey. The heat from the radioisotope energizes a miniature, closed-cycle steam engine which has a condenser, feed water pump, heat dissipation system, and related controls. A molten LiH heat source for an implanted steam engine operating a silastic sac-type heart pump is proposed in U.S. Pat. No. 3,434,162 to Wolf.

The possibility of a fuel cell power source for a mechanical heart was mentioned in passing by W. Lillehi in an article titled "In Ten Years — A Mechanical Heart / In 2 -5 Years — Heart Transplants" appearing in Medical News Vol. 183, No. 12, pages 23–24. Somewhat later, a research feasibility study on an implantable fuel cell for an artificial heart was undertaken by R. F. Drake et al of Monsanto Research Corp. reported in a "First Annual Summary Report" and a "Second Annual Summary Report" on an "Implantable Fuel Cell For An Artificial Heart," dated Feb. 15, 1968 and July 10, 1968 (available Jan. 1969), under Public Health Contract number PH43-66-976 (available through the Clearing House, Springfield, Virginia 22151 as documents PB177,695 and PB182,591).

The fuel cell proposed in the Drake et al. study would have both the cathode and the anode utilizing reactants derived from the blood. For the cathode, oxygen is supplied by a capillary flow deoxygenator laminated onto a cathode structure. For the anode, dextrose would be electro-oxidized as the fuel. While the oxygen associated with hemoglobin in arterial blood seems a logical source of oxygen for the fuel cell, the drawbacks are both numerous and difficult of solution. Two major problems involve 1) electrode poisoning, and 2) oxygen availability.

The first of these problems arises because the blood contains soluble metabolic intermediates which must be separated before oxygen can be consumed on any catalyst surface so far developed. The poisoning effect of organic materials in tissue on the oxygen electrode has been described by Wolfson et al. in "The Bioauto Fuel Cell: A Device For Pacemaker Power From Direct Energy Conversion Consuming Autogenous Feul" appearing in Trans. Amer. Soc. Artif. Int. Organs, 14, pages 198–209 (1968). The practical operability of such a fuel cell thus depends in part upon the unsolved problem of finding a selective catalyst that will reduce oxygen in the presence of such organic metabolites without simultaneously oxidizing them or be poisoned by them.

The second mentioned problem arises from the necessity of separating oxygen from the blood. Although the oxygen content of the blood, expressed as oxygen carried by hemoglobin, is high, the solubility of oxygen in plasma under one atmosphere pressure is only on the order of $10^{-3}$ moles. Solubility at the oxygen partial pressure over arterial blood is less than one-seventh of this value and is therefore less than 2 percent of the total concentration of small oxydizable organic compounds in the blood.

The method of oxygen separation set forth in the Drake et al report employs a capillary flow deoxygenator laminated to the cathode. While this method has the advantage of effectively separating oxygen from the organics, it requires a very large area. This necessitates a cumbersome unit which will predictably cause considerable blood damage unless the size is unreasonably large. From the design criteria point of view the capillary deoxygenator unit for oxygen separation will be the most bulky and heavy unit in such a proposed system in view of the low oxygen concentration in blood plasma, and appears to be a serious drawback to such a system being carried out in practice.

In the Drake et al report, the most promising system appeared to be the conversion (oxidation) of $\beta$-D-glucopyranose to D-gluconic acid at the anode. The proposed design involved flow of blood to contact the cathode first, where oxygen is adsorbed from oxyhemoglobin. Then the blood is to counterflow past the anode where the carbohydrate fuel is to be adsorbed. The individual cells are to be composed of porous electrodes with highly specific catalysts separated by a thin ion exchange membrane.

As for anode materials, Drake et al investigated enzyme-, chelate-, and alloy-catalyzed electrodes. The former was rejected, and the latter two appeared most promising, although adequate performance with dextrose at blood concentration levels was not achieved with either. The chelate-catalyzed electrode investigation involved a multi-layered, multi-functional phthalocyanine based electrode structure.

As for the alloy-catalyzed anode, a "Hipore" electrode substrate was used. This substrate is produced by uniformly plating Ag or Ni on exterior plastic surfaces of open-cell polyurethane foams. The urethane is then pyrolyzed away leaving a 3-dimensional metallic replica of the original foam structure which is further plated. A "proprietary" catalyst powder is mixed with a binder of polystyrene maleic anhydride which is rolled into the "Hipore" substrate and fixed by curing. The proprietary catalyst is not known but may be a 5-component noble metal catalyst. Results were said to be "encouraging," although design performance "goals" with dextrose at blood level concentrations were not achieved. Latest work involves the use of Pd-Ag foil hydrogen diffusion electrode.

Another serious drawback to such a fuel cell power source lies in the fact that operation is proposed at around neutral electrolyte pH, in contrast to highly alkaline or highly acidic fuel cells for ordinary uses. System analysis has shown that the power demand of the heart of a normal adult consists of an average 2 watts interspersed by peaks of up to 4 – 6 watts. The power source of a total replacement artificial heart must be designed to handle such a duty cycle, i.e., change in power demand, so that the patient can lead a normal life. But, as a result of neutral pH operation, the proposed fuel cell could respond only very slowly to changes in power demand, the lag time in some circumstances being obviously fatal. One solution is to use an acid electrolyte isolated from the body fluids, as in the latter work of Drake et al. Another solution may be to operate the fuel cell at above peak power, but size, output, and heat rejection problems rule this out as a practical approach.

While use of a hybrid system has been proposed for an implantable power source, it has been suggested only in connection with the use of a lithium fluoride-lithium chloride eutectic as a thermal energy source in combination with a radioisotope-"prime mover" power source by Huffman et al. "Design Of An Implantable, Rankine-Cycle, Radioisotope Power Source," at the Inter Society Energy Conversion Engineering Conference at Miami Beach, Florida, Aug. 13–17, 1967.

THE INVENTION

OBJECTS

It is among the objects of our invention to provide an implantable fuel cell as a power source for any type of electrically driven heart pump or pacemaker device that overcomes the objections and disadvantages of proposed prior art fuel cells.

It is another object to provide an improved anode for a biologically implantable fuel cell, and a method for its operation.

It is another object of our invention to provide a special fuel cell structure adapted for implantation.

It is another object of our invention to provide special anode materials for oxidation of blood fuels such as blood carbohydrates, which anode structure is specially adapted for incorporation into a fuel cell of the airbreathing cathode type.

It is another object of our invention to provide a fuel cell of particular anode type and overall structure such as is adaptable for incorporation into a hybrid power system of the fuel cell in combination with a storage battery for peak power requirements, reduced fuel cell size, more nearly steadystate fuel cell operation, and high redundancy capability.

Still further objects of our invention will be evident from the detailed description which follows.

SUMMARY

The fuel cell of this invention is of the air-breathing type in which the cathode is ventilated through a percutaneous airway by a balloon system as disclosed and claimed in our copending application Ser. No. 857,321, filed on even date, the disclosure of which is herewith incorporated by reference. The improved anode of this invention utilizes blood organics as fuel, particularly glucose, and is attached, as by sutures, to a source of venous flow in the body. As with the fuel cell of our aforesaid copending case, the fuel cell of this invention may be integrated as a part of the heart pump mechanism or placed at some remote location where a portion of the venous blood can be diverted through the fuel cell on its way to the heart. The anode chamber of our fuel cell may form a portion of the atria or blood collecting plenum of the heart pump, but preferably is placed in the outflow tract of the prosthetic heart pump right ventricle so that the pumping force provides enough power to overcome the resistance of both the anode and the pulmonary vascular bed.

The anode is separated from the whole venous blood by a thin, porous membrane capable of passing a blood ultra-filtrate containing the oxidizable organics. The organics contact the catalyst anode which is preferably of a "felt"-type construction, with the ultra-filtrate at approximately neutral pH acting also as the electrolyte. The anode is backed by a similar membrane, on the obverse side of which is coated the cathode catalyst. One embodiment of structural configuration provides a generally sinuous anode chamber, with the glucose exchange membrane, felt anode, cathode support membrane, cathode catalyst and cathode air cavity structure projecting thereinto like fingers from opposite sides. The outer structural members are of a plastic compatible with body tissue and fluids, such as silastic. Power of 4.5 watts is available from such a cell having electrode area of 3000 sq. cm., which, in the presently preferred configuration has a total volume of about 1200 cc. (about 3.8 cm. thick × 15 cm. wide × 20 cm. high) and weighs empty about 600 gm. (1.3 lbs.).

As in our above mentioned copending application, the fuel cell of this invention may be connected in parallel with a storage battery, preferably of the silver- or nickel-cadmium type to form a hybrid power system. In such a system each component is selected to be capable of powering the blood pump alone. This important feature gives the fuel cell-storage battery hybrid system an outstanding redundancy capability. In the case of failure of the main fuel cell unit, the storage battery will provide sufficient power to operate the blood pump until the patient can be safely transferred to a hospital for emergency replacement of the fuel cell. Conversely, in the event of failure of the battery, the patient can survive indefinitely on the fuel cell alone by refraining from only those activities which require peak power. Such a hybrid system provides improved peak power capability and efficiency of the system. The fuel cell reliability and life is increased since in a hybrid system the fuel cell can be permitted to operate within a narrow band of power output, thus more nearly approximating steady-state conditions. During normal demand, the fuel cell powers the blood pump and continuously recharges the storage battery. At peak demand, almost all of the extra power is supplied by the battery while the fuel cell continues to operate at nearly a steady-state. Since the fuel cell need not supply the total power to the system for all demands, the fuel cell may be reduced in size which is important in view of the limited volume available for implantation.

THE FIGURES

The invention is described in more detail below with reference to the following figures in which like elements are referred with like numbers throughout.

DETAILED DESCRIPTION

General System Specification and Implantation Arrangement

During a 24-hour living cycle the normal adult heart power demand is an average of 2 watts for continuous pumping power interspersed with peak loads of up to from 4 to 6 watts, depending on the particular activity. On the basis of conversion of the electrical power of the hybrid fuel cell-storage battery system to pumping power by a suitable pump as being 50 percent, Table 1 below outlines the basic specifications of our hybrid system:

TABLE 1

Implantable Hybrid Power Source Specifications

| Specification | Normal Load | Peak Load |
| --- | --- | --- |
| System power output, watts | 4 | 8.5 |
| Fuel cell power output, watts | 4.5 | 4.5 |
| Battery power output, watts |  | 4 |
| Fuel cell unit cell voltage, volts | 0.45 | 0.45 |
| Battery capacity watt hours | 10 | 10 |
| Fuel cell efficiency, per cent | 37.5 |  |
| Overall system thermal efficiency, per cent | 16.6 |  |
| Total heat loss, watts | 10 |  |

Thus, our fuel cell operates at a constant output of 4.5 watts of which 4 watts are designated to be used to power the motor pump device at 50 percent conversion to give 2 watts continuous pumping power. The remaining 0.5 watts will continuously recharge the storage battery. The overall thermal efficiency of 16.6 percent for our hybrid system is comparable to the efficiency of the proposed isotope-"prime mover" system of the prior art: The total heat rejection rate of the fuel cell-storage battery power source hybrid system is about 10 watts. This figure includes the heat loss of the motor-heart pump device. The heat is rejected to the blood stream and is well within the acceptable rate considering the comparable heat loss of the replaced natural heart. Within the above specifications, either nickel-cadmium or silver-cadmium storage batteries may be used. While present designed silver-zinc batteries do not appear suitable, improvements in technology of such batteries may make them suitable for future inclusion in the hybrid system.

Figure 1:
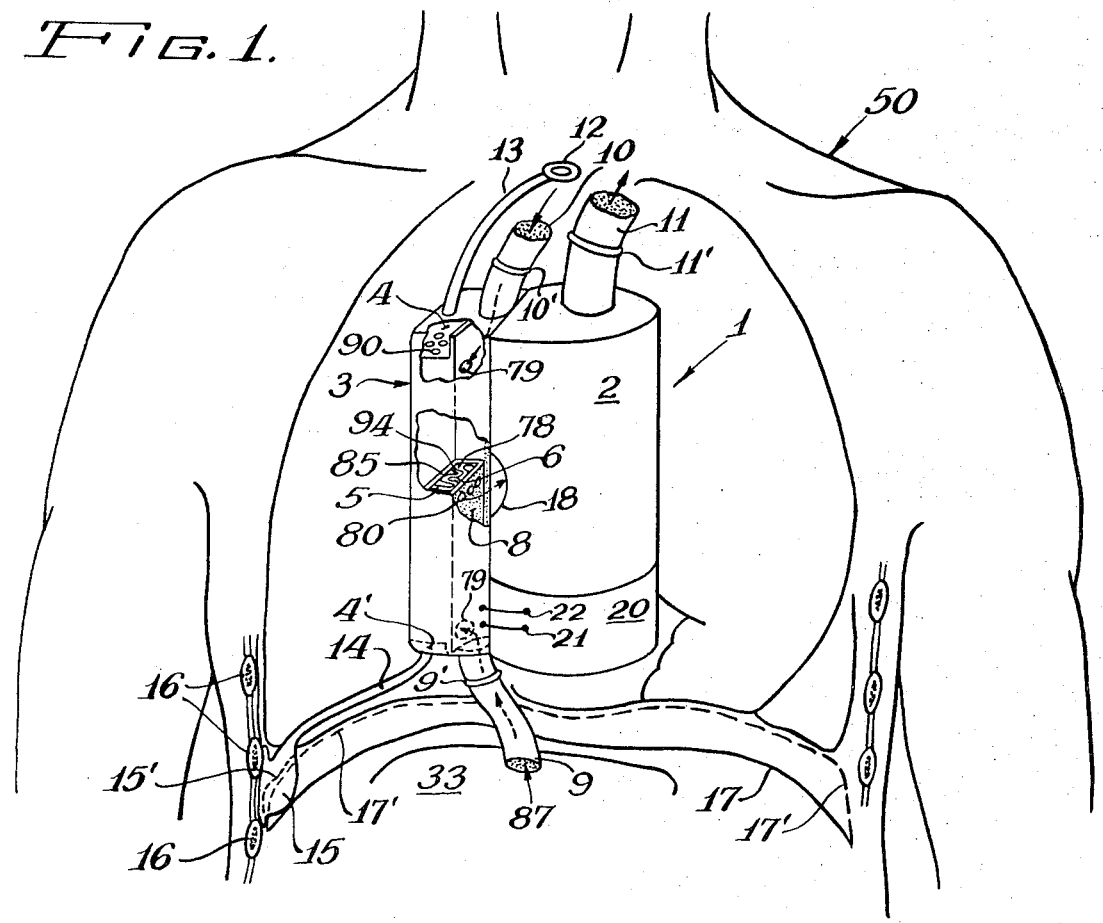
FIG. 1 shows schematically the general placement of the fuel cell-heart pump prosthesis combination in the thoracic cavity, and illustrates a typical placement of the percutaneous airway and balloon ventilation system as connected to the cathode cavity.

FIG. 1 shows the placement of the hybrid system in combination with the heart pump. Totally implanted into the thoracic cavity of patient 50 is the power source-heart pump system 1 which comprises fuel cell 3, battery 20 and heart pump 2, the latter including a pump and "motor." The fuel cell 3 has the following basic parts: air chamber manifolds 4, 4' which lead through top and bottom apertures 90 in structural plastic 85 into cathode air spaces 94 (see FIG. 2), a gaseous diffusion cathode catalyst 5 on a cathode support membrane 86, an anolyte chamber 6 in which is placed the felt type anode catalyst 7, a glucose exchange membrane 88, an anode chamber 78 through which the whole venous blood 87 passes from anode manifold 8 via openings 79 and 80, and leads 21 and 22 from the anode and cathode, respectively, to the battery 20. Other leads (not shown) interconnect the "motor" of the heart pump, the battery and the fuel cell in parallel to provide the hybrid system electrical connections. The bi-cells 89 may be connected in series or parallel as desired.

In the embodiment shown in FIG. 1, the fuel cell is placed on the venous input side of the heart pump prosthesis. The superior vena cava 10 is sutured at 10' to a silastic covered dacron tube which leads into the anode manifold 8. Likewise, the inferior vena cava 9 is sutured at 9' to a tube which also leads into the anode manifold as shown by the arrows. The blood organics which are utilized by the anode pass through the exchange membrane 88, contact the anode 7 in the anolyte chamber wherein they are mixed as a portion of the blood ultrafiltrate and oxidized. The oxidation products pass back into the blood while ionic conductance permits the completion of the internal circuitry of the cell with the cathode through the cathode support membrane 86. The blood then passes into the heart pump prosthesis via aperture 18 as shown schematically in FIG. 1. In the alternative, the anode chamber may be equally well located in some other venous flow path, such as the pulmonary artery outflow from the right side of the heart before the venous blood passes through the lung.

The blood is then pumped by suitable heart pump and "motor" mechanism through the aorta 11 sutured to the silastic covered dacron tube leading from the heart pump at 11'. Any suitable heart pump and motor mechanism may be utilized, the particular type not being critical except as it meets the power conversion specifications set forth above, and is otherwise compatible to the blood, i.e., satisfies criteria for a low percentage of mechanical or chemical (hemolytic) damage to the blood during the pumping action. Likewise, criteria for the blood pressure cycle and pumping output must be met. The types of pumps which are disclosed and referred to in our above mentioned copending application may be used with advantage in connection with the fuel cell of this invention.

The fuel cell 3 employs an air-breathing cathode with a balloon type of system that ventilates the cathode manifold and cathode chambers. Any of the embodiments shown in our copending application may be used for the cathode in the fuel cell of this invention, and a typical embodiment comprises one or more pores or openings 12 in the integument which is located so as to have free access to the outside air, a means of propelling the air from the outside to the desired interior location within the body, and a system of tubes or ducts connecting the pores and the propelling means with the cathode chamber itself. Just as the artificial heart and its pump are encased in a biologically acceptable plastic, for example a silicone rubber, tissue contacting parts of the air-breathing assembly, fuel cell, and storage battery are constructed or coated with such material. For example, the tubes may be made of silicone rubber, silicone rubber reinforced with an embedded stainless steel spiral, or a dacron mesh coated with silicone rubber.

The silicone rubber or other plastic type of tube 13 leading from the fuel cell is bonded permanently to a plastic flange or reverse nipple which has a rim of plastic felt such as a dacron velour that is fixed surgically in a small incision through the skin to form the pore opening 12. The velour flange is initially sutured and the skin and subcutaneous tissues heal and grow into the mesh of the plastic velour felt. The pore opening may be located at the base of the neck which is an area that can be kept open to the atmosphere in the manner commonly done with permanent tracheostomy of laryngectomy patients. However, the pore may be adapted to be placed in any convenient location, and where necessary or desired, the pore can be moved or revived from time to time.

From the lower end of the cathode manifold space 4, extends a second tube 14 into connection with a balloon 15 which serves as a means of propelling air from the outside into the cathode manifold and cathode diffusion spaces 5. The balloon is relatively small, being on the order of 100 to 300 ml. in size. As seen in FIG. 1, the balloon is advantageously placed in the costophrenic angle, that is, between the diaphragm 17 and the parietal pleura, interior of the ribs 16, at the most dependent recess of the thoracic cavity. During inspiration, the balloon is expanded to full size as shown in FIG. 1 in solid lines by the diaphragm 17 being at its lowermost position. Upon expiration, the diaphragm rises to position 17', thus compressing the balloon to the size shown in dotted lines and identified with numeral 15'. The expansion and contraction of the balloon thus assists in ventilating the cathode manifold by drawing air into and expelling it from the manifold in a cycle equal to and in phase with the breathing rate of the patient. In a preferred embodiment, the balloon contains a sponge of urethane or silastic rubber which has an open cellular structure to maintain a gentle inflation in the absence of applied external force. The sponge has a compliance or modulus of elasticity approximately the same as that of the surrounding tissue. Alternatively, a spring biasing means may be incorporated into the balloon walls, and so formed as to bias the balloon into the open position.

Figure 2:
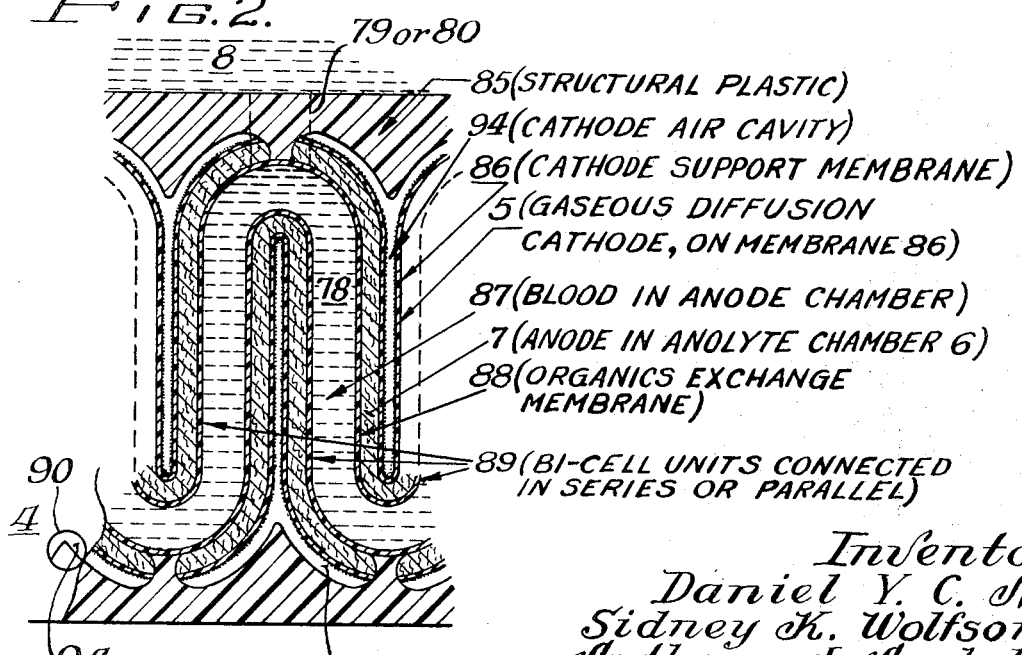
FIG. 2 shows in cross-sectional detail one particular structure of the fuel cell of our invention.

The venous blood passes into the anode manifold 8 which communicates with the anode chamber 78. In the embodiment of FIG. 2, the anode chamber 78 is a sinuous passage in which the blood flows perpendicular to the plane of the paper. A membrane separates the anode chamber 78 from the anolyte chamber 6. The membrane is permeable only to a plasma ultrafiltrate containing the oxidizable organic compounds such as glucose which are oxidized in the fuel cell. For example, the membrane may be any permeable material of appropriate pore size, such as a cellulosic type of material on the order of 0.1 ml. thick membrane having a pore size of about 20 Angstroms and a 50 percent porosity. Any other type of material such as micoporous polyvinyl chloride, polyethylene or polystyrene may be used.

Thus, passing through the membrane is a buffered plasma ultrafiltrate having a pH of 7.4 which serves as the electrolyte. Since the oxidizable organic material also passes through the membrane, the fluid is actually an anolyte which comes in contact within the catalyst felt anode disposed in the anolyte chamber 6 which is defined between the "glucose" exchange membrane 88 and the membrane 86. The catalyst felt anode may occupy the entire space between the two membranes and thus serve as a support for both membranes, yet it is porous to permit the circulation of the oxidizable fuel, for example glucose, into contact with the anode.

One of the problems involved in the use of a neutral electrolyte as opposed to acids or alkali electrolytes used in conventional fuel cells is that the oxygen electrode kinetics are considerably less rapid than acid or alkali. The log of the reaction rate falls off linearly as the pH increases at the acid end of the pH spectrum, and increases with increasing pH at the alkali end of the spectrum. In consequence, the rates at pH 1 and 13 are approximately equal whereas the rate in the neutral range is on the order of 2 decades or more lower.

Second, in neutral solutions it is very difficult to maintain a low product concentration gradient at practical reaction rates even in concentrated solutions of what are normally considered to be good buffers. The buffering capacity of such solutions, that is their ability to compensate changes in pH and prevent concentration gradients of $H^+$ and $OH^-$ across the cell is vastly inferior to that of strong acid or alkaline solutions. The pH changes across the cell cause potential differences on the order of 61 mV per pH unit at 37° C. The practical consequence of the resultant $[H^+]$ and $[OH^-]$ gradient across the cell is a very slow response to load changes. Unlike conventional acid or alkaline fuel cells which can cope with fluctuating loads, the neutral fuel cell is slow in recovering from intermittent high load demands. If such a fuel cell is continuously subjected to such fluctuating operating conditions, it will deteriorate rapidly. By employing our fuel cell in combination with a storage battery, we are able to limit the operating load range of the blood organics-utilizing fuel cell to a substantially constant value, or to a narrow band. The battery, hybridized to the fuel cell, satisfies the peak load power, while at low demand the fuel cell both charges the battery and permits pump operation.

The fuel cell of this invention utilizes glucose and other readily oxidizable metabolic materials as fuels. These are present in normal blood at relatively low concentration. The electrode potential of these carbohydrates at blood concentration is about −0.4V on the standard hydrogen scale at pH 7.4. While the ultimate product of glucose oxidation is reported to be gluconic acid, we have found that gluconic acid itself will function as a fuel at low current density. Nevertheless, we assume that only two electrons are available from the electrodic oxidation of one glucose molecule, instead of the 24 theoretically available. While the concentration of glucose in individuals is subject to considerable variation, an approximate value is on the order of 80 mg. per 100 ml. of whole blood. The membrane as set forth above permits the passage of the glucose molecules by diffusion and/or mass flow without undue damage to blood corpuscles. The membrane also prevents large capillary absorbable molecules, for instance, proteins and enzymes, from coming into contact with the anode where they could act as selective poisons and have a deleterious effect on the reaction rate. In order to further avoid the effect of lowering of the concentration of the oxidizables such as glucose, which would result in a loss in potential, the venous blood stream which has a low oxygen content is utilized.

As anode materials, smooth rhodium, and 60 percent platinum-ruthenium alloys support a current density of at least $3.0\mu$ A/sq. cm. without poisoning. Open circuit decay in .005M glucose solutions becomes negligible after 48 hours in the solution, when electrodes take up potentials approximately 70 mV above theoretical values. In addition, electrodes polarized with current densities of $1\mu$ A per sq. cm. showed negligible polarization, and at these values poisoning effects were not apparent in .005 M glucose in 0.154 M Ringer's phosphate solution (pH 7.4).

Our preferred glucose electrode structure is one made from a high porosity gold fiber felt. This felt serves as a catalyst support and current collector combined. Rhodium black catalyst powder is deposited on the fibers so that there is an eventual "roughness factor" (true/projected area) on the order of 3000 – 4000 or greater. Local current densities are thus very low, being about $1\mu$ A/sq. cm. with 3 – 4 m A/sq. cm. current density per square cm. of projected area. Although the glucose concentration in the electrode enclosure, the anolyte chamber, is about half the plasma concentration due to the concentration drop across the glucose-diffusing membrane 88, the glucose is on the order of 0.0025 M concentration in the vicinity of the anode. The diffusion limiting current for glucose of this concentration in the vicinity of the anode is about $10^{-4}$ amps/sq. cm. In this case, the current density, expressed relative to the support area and with a fiber "roughness factor" of about $10^2$ is about $2 \times 10^{-2}$ amps per projected square cm. of anode. With a fuel cell configuration such as shown in the embodiment of FIG. 2, a current density on the order of about 4 m A/projected sq. cm. may be obtained. The anode, operating at a polarization of about 200 mV, gives an overall cell performance of about 600 mV at 4 m A/sq. cm.

While the thickness of the glucose exchange membrane is preferably on the order of 0.1 ml. thick, under certain conditions a thicker film may be used, on the order of .22 ml. thick. The thicker film may be used in such cases where the glucose is completely oxidized yielding the 24 electrons per molecule which will decrease the required glucose flux by a factor of 12. The pump power requirements specified above require a glucose flux on the order of only $2 \times 10^{-8}$ moles/seconds-cm.$^2$ (at 4 m A/sq. cm.) where gluconic acid is the end product and itself is not oxidized. A conservative value for the blood concentration of glucose in the inferior vena cava on the order of .005 M per liter yields an anode face concentration of .0025 M per liter with the membrane porosity of 50 percent. Additional glucose transfer is obtainable by providing bulk flow of the ultrafiltrate through the anode membrane 88. Where the fuel cell container is constructed to be slightly flexible, the cyclic pressure differential between the inferior vena cava and the thoracic cavity wall forces the plasma ultrafiltrate back and forth through the membrane which performs filtration while the blood cells and protein molecules remain in the anode space 78. This also serves to agitate to some degree the ultrafiltrate pool which increases the electrode mass transfer rate.

The inner surface of the anolyte chamber is provided by a membrane 86 which permits the diffusion of anolyte into contact with the cathode catalyst surface 5, thus permitting ionic exchange between the anode and the cathode. The same type of membrane as described for the glucose exchange membrane may be used, or alternatively, a thin ion-exchange membrane at pH 7.4 may be used.

Supported by the membrane 86 is a gaseous diffusion cathode catalytic material 5 which preferably is a platinum, or platinum alloy, metal such as platinum black. The cathode air cavity space 94 has a total air ventilation flow of about 14 ml. per second which is provided by a 200 cc. balloon volume. The cathode thus has a polarization of about 400 mV with a theoretical open circuit voltage of about 1.2 volts.

The cathode catalyst material 5 may be applied to support membrane 86 by any conventional process such as plating or vacuum evaporation. The cathode air cavity 94 may be formed initially with the gaseous diffusion cathode catalyst material plated thereon subsequently. A reducing reagent may be passed through the interior of the fiber and a metal ion solution may contact the exterior surface. The metal ion passes through the permeable membrane and plates the interior surface. As an alternative process, silver may be vacuum evaporated on a "porvic" type of microporous plastic, and this layer may be subsequently thickened by electrodeposition of palladium on which is applied palladium black. Likewise, the silver may be subsequently thickened by the deposition of platinum to which is applied platinum black. Particular details of suitable techniques are found in U.S. Pat. Nos. 3,116,170, 3,276,909 and 3,351,487.

In our preferred form, attached to the cathode support membrane 86 is a conventional fuel cell gas diffusion cathode. For example, the cathode is formed from a tantalum screen upon which Pt-black is teflon bonded. The resultant cathode is hydrophobic but permits ionic contact and promotes a three-phase active reaction site between the anolyte, the Pt-black catalyst and the oxygen in the air. A typical electrode is the Cyanamid AA-40.

The air flow passes directly over the rough porous surface of the gaseous diffusion cathode 5 in a pulsating flow so that a stagnant gas film does not form to limit the flux of oxygen to the cathode. The oxygen utilized by the cathode is $3 \times 10^{-5}$ moles per second or 0.6 cc. per second at S T P. For the balloon of internal volume of 200 cc., about half the balloon is emptied with each "breath," and there is a net inflow of oxygen into the structure of approximately 7 ml. per second with the outflow rate about the same. Thus, on the basis of a total cathode flow of 14 ml. per second, and an oxygen utilization of less than 5 percent, a polarization of from 400 – 500 mV is obtained with an open circuit voltage of about 1.2 volts.

With the cell of working voltage 450 mV and current density of 4 m A/sq. cm., a total power of 4.5 watts is available in a cell such as shown in FIG. 2 having a total electrode area of about 3000 sq. cm. The total volume of the cell shown in FIG. 2 is about 1200 cc. (about 3.8 cm. × 15 cm. × 20 cm.) about 35 percent of which is blood volume. Exclusive of the fluids, the total weight of the cell is about 600 gm. While a particular structure is set forth in FIG. 2, the configuration using the anode of our invention with an air-breathing cathode system is not critical. For implantation in the thoracic cavity, overall dimensions of about 7.5 × 7.5 × 20 cm. are practical. Similarly, within the spirit of our invention other modifications and equivalents may be designed.

We claim:

1. A fuel cell adapted to be implanted in a body having an anode and an air-breathing cathode for producing electrical energy as derived from blood and air flowing through said fuel cell and supplying said electricity to a prosthetic device implanted in a human body which comprises in combination:
   a. a fuel cell housing adapted for implantation into said human body;
   b. a first sinusoidal cell unit disposed in said housing comprising:
      i. a cathode assembly for receiving air comprising a catalytic cathode material applied to a support membrane, said support positioned in said housing to define a plurality of interconnected U-shaped cathode chambers said support having a relatively sinusoidal folded configuration and adapted to receive air in the interior of said U-shape;
      ii. said cathode support membrane being adapted to transfer ions between the anode and cathode;
      iii. a second membrane disposed in said housing positioned a spaced apart parallel distance from the sinusoidal cathode support to define an anolyte chamber therebetween;
      iv. an anode catalyst positioned in said anolyte chamber to define an anode;
      v. said second membrane adapted to separate a blood ultrafiltrate containing reactive organic compounds from whole blood and to transfer said reactive organic compounds into association with said anode;
   c. a second sinusoidal cell unit disposed in housing, of identical construction as the first cell unit, the second membrane of the second cell unit being positioned a parallel spaced apart distance from the second membrane of the first cell unit to define a blood chamber between said second membrane;
   d. a conduit for transfer of air from the exterior of said body to said cathode chambers, said conduit adapted to be implanted in said body and having an opening communicating with the exterior of the body;
   e. means for current collection from said anode and cathode to provide electrical current for said prosthetic device;
   f. means for connecting the first and second sinusoidal cell units electrically together in series or parallel, to provide a predetermined cell voltage and current output value range; and
   g. means for transfer of blood to said blood chamber;
   h. said first cell and second cell positioned in said housing to provide blood and air flow through said blood chamber and cathode chamber respectively normal to said sinusoidal configuration.

2. An implantable fuel cell as in claim 1 wherein: said anode assembly comprises a catalytic structure capable of oxidizing said organic compounds selected from rhodium, platinum-ruthenium alloy, and highly porous gold fiber felt on which is deposited rhodium black catalyst powder.

3. An implantable fuel cell as in claim 2 wherein: said catalytic structure comprises a highly porous gold fiber felt on which is deposited rhodium black catalyst powder,
said structure having a roughness factor above about 3000.

4. An implantable fuel cell as in claim 1 wherein: said air conduit includes a percutaneous airway adapted to communicate with the exterior of said body via an unhindered pore.

5. An implantable fuel cell as in claim 4 wherein: said cathode assembly includes a catalytic cathode material selected from platinum, a platinum alloy, and platinum black applied to a support.

6. An implantable fuel cell as in claim 2 wherein: said air conduit includes a percutaneous airway adapted to communicate with the exterior of said body via an unhindered pore, and,
said cathode assembly includes a catalytic cathode material selected from platinum, a platinum alloy, and platinum black applied to said support.

7. An implantable fuel cell as in claim 1 wherein said support membrane is an ion exchange membrane.

* * * * *